United States Patent
Campbell

(10) Patent No.: US 6,856,443 B2
(45) Date of Patent: Feb. 15, 2005

(54) METHOD FOR USING LENGTH DISPERSION IN AN ETALON TO APPROXIMATE TARGET RESONANT FREQUENCIES

(75) Inventor: Scott P. Campbell, Thousand Oaks, CA (US)

(73) Assignee: Oplink Communications, Inc., San Jose, CA (US)

( * ) Notice: Subject to any disclaimer, the term of this patent is extended or adjusted under 35 U.S.C. 154(b) by 8 days.

(21) Appl. No.: 10/602,180

(22) Filed: Jun. 24, 2003

(65) Prior Publication Data

US 2004/0004752 A1 Jan. 8, 2004

Related U.S. Application Data

(60) Provisional application No. 60/390,914, filed on Jun. 24, 2002.

(51) Int. Cl.[7] .............................. G02F 1/03; G02F 1/13; G01B 9/02
(52) U.S. Cl. ........................ 359/260; 356/454; 349/198
(58) Field of Search .......................... 359/260; 356/454; 349/198

(56) References Cited

U.S. PATENT DOCUMENTS

2002/0181106 A1 * 12/2002 Xia et al. .................... 359/578

* cited by examiner

Primary Examiner—Georgia Epps
Assistant Examiner—William Choi
(74) Attorney, Agent, or Firm—Scot A. Reader

(57) ABSTRACT

Methods for using a length dispersion of an etalon to approximate target resonant frequencies. Length dispersion usage in the present invention includes, for example, determining the impact of a length dispersion of an etalon on resonant frequencies of the etalon and may involve, for example, selection of one a more of a refractive index step, a number of layers, and a layer thickness of one or both dielectric stacks of the etalon in consideration of length dispersion. A featured method comprises defining target resonant frequencies and selecting an etalon having resonant frequencies which approximate the target resonant frequencies wherein the selection of the etalon is made based at least in part in consideration of a length dispersion of the etalon.

24 Claims, 2 Drawing Sheets

METHOD FOR USING LENGTH DISPERSION IN AN ETALON TO APPROXIMATE TARGET RESONANT FREQUENCIES

CROSS-REFERENCE OF RELATED APPLICATION(S)

This application claims the benefit of U.S. provisional application No. 60/390,914, filed on Jun. 24, 2002, the contents of which are incorporated herein by reference.

BACKGROUND OF THE INVENTION

An etalon is a pair of mirrors, e.g. dielectric stacks, facing one another, aligned in parallel to one another, and separated by an optical path. At least one of the mirrors is partially reflective. Once light gets into an etalon through one of its partially reflective mirrors, it is temporarily restrained in the etalon's cavity; that is, it bounces back and forth between the two mirror faces for a while. Certain light frequencies are restrained longer than others. The light frequencies that are restrained the longest are called the resonant frequencies. These resonant frequencies occur with periodicity, or near periodicity, according to the equation $$v = \frac{Mc}{2nL\cos\theta} \quad (1)$$

where $v$ is the resonant frequency, M (an integer) is the mode number of a particular resonance point, c is the speed of light, n is the refractive index of the etalon's cavity medium, L is the etalon cavity's physical thickness and $\theta$ is the beam angle in the etalon.

Under ideal conditions, integer steps in M will produce periodic intervals in $v$. However, under real conditions, n is often a function of frequency due to material dispersion in the etalon's cavity medium. Moreover, frequency dependence of n causes frequency dependence in $\theta$ if n diverges from the refractive index outside the etalon. These frequency dependencies of n and $\theta$ mean that integer steps in M will not produce precise periodic intervals in $v$, but instead will produce non-periodic intervals in $v$.

Frequency dependencies caused by material dispersion are generally undesirable. In certain applications, it may be desirable to have precise periodicity in $v$. For example, in certain telecommunications applications it may be desirable to keep an etalon's resonance points on a regular grid in order to reverse chromatic dispersion on regularly-spaced channels. This creates a need for corrective tuning to reverse any non-periodicity induced by material dispersion. In other applications, it may be desirable to have quasi-periodicity, that is, to place the etalon's resonance points on an irregular grid. Even there, however, any non-periodicity induced by material dispersion is unlikely to match the desired quasi-periodicity, and corrective tuning is therefore required.

SUMMARY OF THE INVENTION

The present invention, in a basic feature, is directed to the use of the length dispersion in one or more mirrors of an etalon to approximate desired, or targeted, resonant frequencies. A featured method comprises defining target resonant frequencies that may be periodic or quasi-periodic; and selecting an etalon having resonant frequencies that approximate the target resonant frequencies, wherein the selection of the etalon is made based at least in part in consideration of a length dispersion in one or more mirrors of the etalon.

A second featured method comprises defining target resonant frequencies; determining a material dispersion for an etalon; and selecting a length dispersion for the etalon suitable to cooperate with the material dispersion to produce resonant frequencies which approximate the target resonant frequencies. Length dispersion selection may include, for example, selection of one or more of a refractive index step, a number of layers, and a layer thickness of one or more dielectric stacks of the etalon.

A third featured method comprises determining a length dispersion in one or more mirrors of an etalon; determining an impact of the length dispersion on a plurality of resonant frequencies of the etalon; comparing the plurality of resonant frequencies of the etalon with a plurality of target resonant frequencies that may be periodic or quasi-periodic; and selecting the etalon for application in an optical system based at least in part on a result of the comparison.

These and other features of the invention will be better understood by reference to the detailed description of the preferred embodiment, taken in conjunction with the drawings which are briefly described below. Of course, the invention is defined by the appended claims.

DETAILED DESCRIPTION OF THE PREFERRED EMBODIMENT

Figure 1:
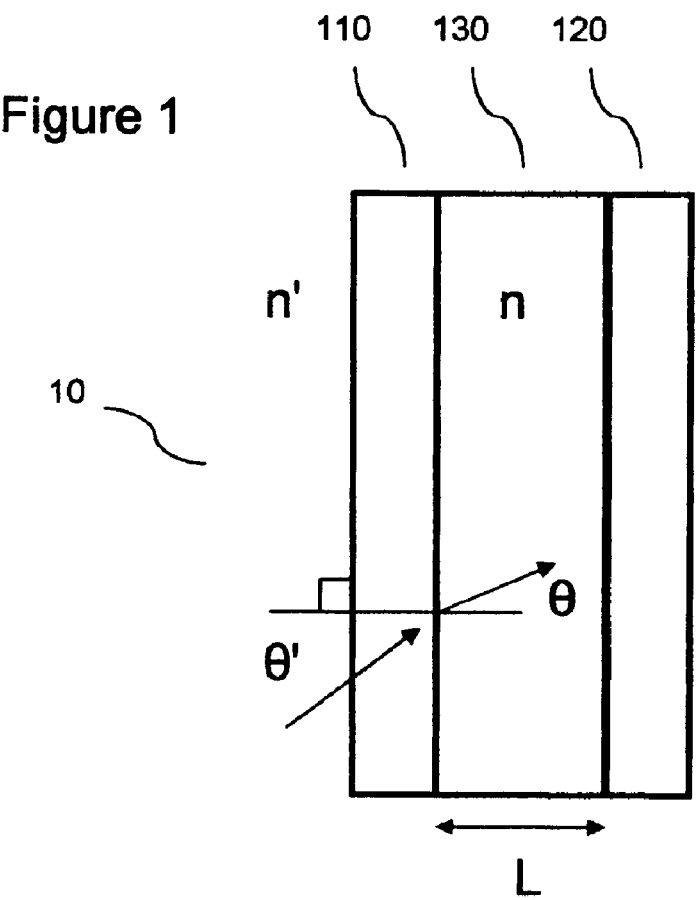
FIG. 1 illustrates a Gires-Tournis etalon (GTE).

In FIG. 1, a Gires-Tournis etalon (GTE) 10 is shown. GTE 10 has a partially reflective mirror 110, a fully reflective mirror 120 and a cavity 130 having a physical thickness L in between. Light enters and exits GTE and a cavity 130 partially reflective mirror 110. GTE 10 subjects different wavelength components of the light to different delays in accordance with its resonant properties. That is, the partial reflectivity of mirror 110 causes certain wavelength components to be restrained in cavity 130 longer than others. GTE 10 thereby imposes a frequency-dependent delay on the wavelength components of the light which can, in one application, assist in correcting chromatic dispersion previously induced on the light's pulses by an optical system, such as a high speed, long haul, Dense Wave Division Multiplexing (DWDM) transmission system. The wavelength components that are restrained in cavity 130 the longest are associated with resonant frequencies. In DWDM applications, it is often desirable to keep an etalon's resonant frequencies on a regular grid, that is, to achieve a perfectly periodic resonance interval across multiple modes, in order to reverse chromatic dispersion on regularly-spaced channels. In other applications, it may be desirable to keep an etalon's resonant frequencies on an irregular grid, that is, to achieve a quasi-periodic resonance interval across multiple modes.

The medium of cavity 130 has a refractive index n which, due to material dispersion, is a function of frequency. This frequency dependence can cause variations between the refractive index n inside cavity 130 and the refractive index n' outside GTE 10 which can, in turn, cause a difference between the beam angle $\theta'$ at which light enters GTE 10 and the beam angle $\theta$ at which the light traverses cavity 130. Thus, material dispersion in the medium of cavity 130 can produce frequency-dependent variations in both n and θ, i.e. non-periodicity of resonant frequencies.

From equation (1), it is known that the product nLcos θ must remain constant to keep an etalon's resonant frequencies on a regular grid. The frequency-dependent refractive effects induced by material dispersion may thus make it necessary to tune GTE 10 in order to maintain it on a regular grid. In a preferred embodiment of the invention, GTE 10 is tuned by selecting and/or modifying GTE 10 with an appropriate frequency dependence in L to counteract the frequency dependence of the product ncos θ induced by material dispersion.

Alternatively, the frequency-dependent refractive effects induced by material dispersion may be insufficient to shift the resonant frequencies of GTE 10 away from a regular grid, yet it may be desirable to purposefully shift the resonant frequencies of GTE away from a regular grid. In another preferred embodiment, therefore, GTE 10 may be deliberately detuned from a regular grid by selecting and/or modifying GTE 10 with an appropriate frequency dependence in L.

Additionally, whether or not an etalon's cavity suffers from material dispersion, it may be desirable to intentionally induce a quasi-periodicity onto the resonant frequency pattern of an etalon. For example, when multiple etalons are used in conjunction to compensate for or create chromatic dispersion, quasi-periodicity in the etalons' resonant frequencies may assist in maintaining a desired performance from the etalon group across multiple modes.

Consider now the variable portions of equation (1) expanded such that $$\left(n_0 + \frac{\partial n}{\partial v}(v - v_0)\right)\left(L_0 + \frac{\partial L}{\partial v}(v - v_0)\right)\left(\cos\left(\theta_0 + \frac{\partial \theta}{\partial v}(v - v_0)\right)\right) = k \quad (2)$$

In the case where it is desirable to maintain the resonant frequency ν on a regular grid, k needs to be constant with ν. In the case where it is desirable to vary resonant ν points in a deterministic manner, k needs to be a deterministic variable of ν. If the frequency dependence of n and θ are known, all that remains is to determine the frequency dependence of L to either correct for, or create, irregular resonant points. To that end, it is vital to understand how L may vary with ν. One method that can provide a frequency-dependent length in an etalon's cavity is to design a frequency-dependent length into an etalon's mirrors.

In an ideal mirror, the light incident to the mirror experiences no penetration depth. However, in realistic mirrors, there is always a non-zero penetration depth into the mirror. In all mirrors, there is thus an effective length ($L_{eff}$) into which light penetrates before reflecting back out of the mirror. This effective length $L_{eff}$ does not represent a single physical length into which the light actually penetrates, but rather represents a length into which the reflected light acts as if it had penetrated. The dependence of the effective length $L_{eff}$ of a mirror on the frequency of light can be considered the mirror's length dispersion, and is alternatively expressed as the phase of reflection, which is related to effective length $L_{eff}$ through the equation $$PD \approx 2\pi n L_{eff} \cos\theta/\lambda \quad (3)$$

where n is the average refractive index of the mirror, θ is the beam angle in the mirror and λ is the wavelength of the incident light.

Where the mirror in question is a dielectric stack, as is common in etalons, the length dispersion, i.e. frequency dependence of the effective length $L_{eff}$ or phase of reflection, can be manipulated by changes to the stack's design. As well, in an etalon there will be an effective length $L_{eff}$ (and phase reflections) for each of two mirrors, such that net length dispersions (and net phase reflections) can be formed from length dispersions of mirror combinations. The variation in a tailored length dispersion is represented in the $(\delta L/\delta v)(v - v_0)$ term from equation (2).

Figure 2:
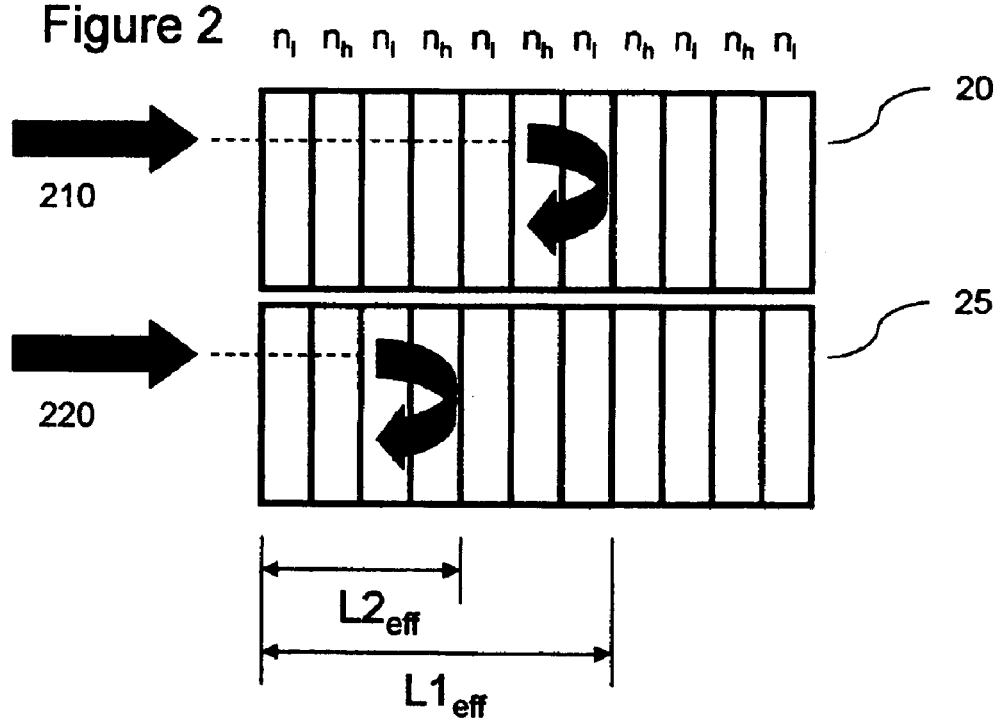
FIG. 2 illustrates an effective length variation for two candidate dielectric stacks for an etalon.

Turning now to FIG. 2, an effective length variation for two candidate dielectric stacks for an etalon, such as GTE 10, is shown. Dielectric stacks 20, 25 are quarter-wave stacks having respective multiple pairs of lo-hi refractive index steps $n_l$, $n_h$. Particularly, lo-hi pairs within stack 20 have a relatively small refractive index step (i.e. $n_h$-$n_l$ is small), whereas lo-hi pairs within stack 25 have a relatively large refractive index step (i.e. $n_h$-$n_l$ is largs). A light beam 210 incident to stack 20 at the Bragg frequency of stack 20 effectively penetrates a relatively large distance, namely effective length $L1_{eff}$, prior to reflection, whereas a light beam 220 incident to stack 25 at the Bragg frequency of stack 25 effectively penetrates a relatively small distance, namely effective length $L2_{eff}$, prior to reflection. Typically, the magnitude of the variation of effective length with frequency scales with the magnitude of the mirror's effective length. Thus, mirrors with large effective lengths will typically have large variations in effective length with frequency, and mirrors with small effective lengths will typically have small variations in effective length with frequency. Armed with this knowledge about length dispersion, one of stacks 20, 25 may be advantageously selected and incorporated in an etalon, or an etalon may be modified, to effectuate a desired shift in the resonance interval for the etalon. There are several methods for determining a dielectric stack's effective length and the frequency dependence thereof. Pochi Yeh, "Optical Waves in Layered Media," Ch. 6, John Wiley and Sons, New York (1988) and Larry Coldren and Scott Corzine, "Diode Lasers and Photonic Integrated Circuits," Ch. 3 and App. 7, John Wiley and Sons, New York (1995), for example, define useful matrix-based calculation methods.

Figure 3:
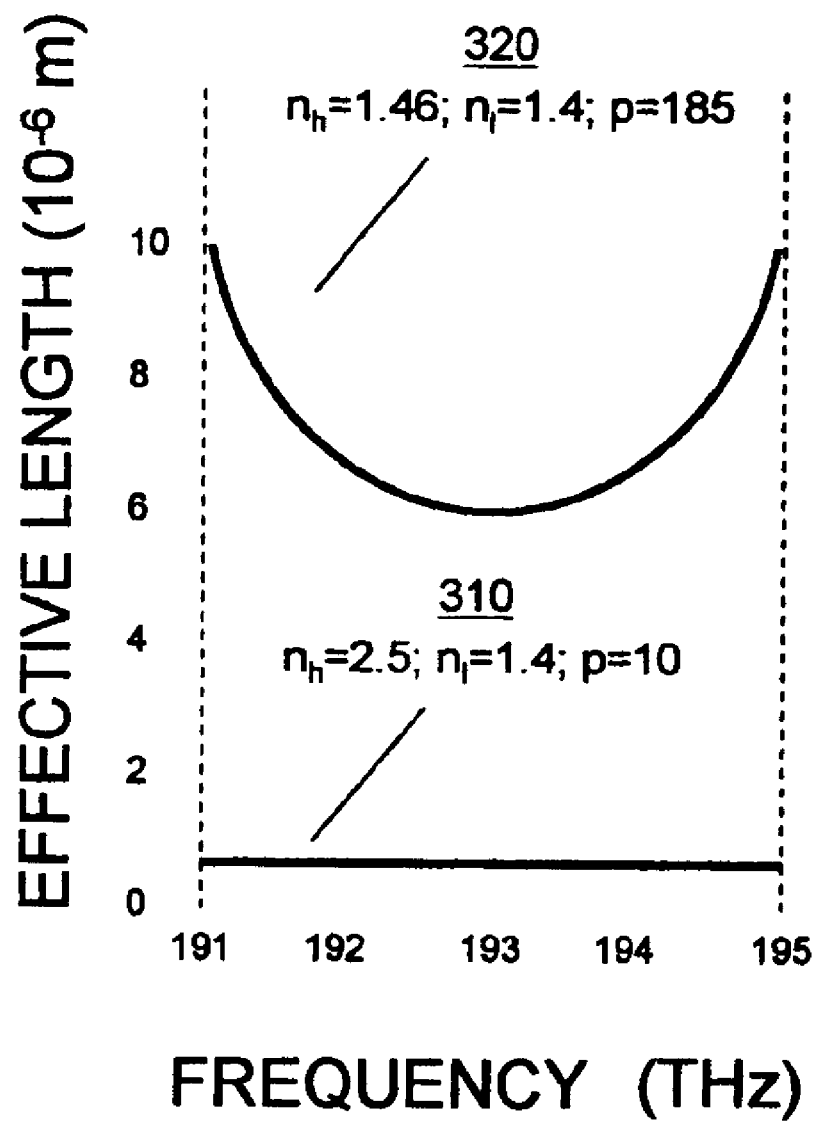
FIG. 3 illustrates graphically a potential length dispersion variation for two candidate dielectric stacks in an etalon.

Turning now to FIG. 3, effective length $L_{eff}$ for two candidate dielectric stacks 310, 320 for an etalon, such as GTE 10, is plotted as a function of frequency ν over a passband between 191 and 195 terahertz. Stacks 310, 320 are again quarter-wave stacks having respective multiple pairs p of lo-hi refractive index steps $n_l$, $n_h$. Stack 310 has a low refractive index $n_l$ of 1.4, a high refractive index $n_h$ of 2.5 and p of ten pairs. Stack 320 has a low refractive index $n_l$ of 1.4, a high refractive index $n_h$ of 1.46 and p of 185 pairs. Both stacks 310, 320 exhibit better than four nines of power reflectivity across the passband; however, the effective length of stack 310 is nearly constant across the passband at about 0.5 microns, whereas the effective length of stack 320 varies from about 10 microns at the edges of the passband to about 6.5 microns at the middle of the passband (which corresponds to the Bragg frequency). Stack 320 could thus be selected and judiciously incorporated in an etalon to tune the etalon to a regular grid, or to deliberately detune the etalon from a regular grid by use of the frequency dependence of the mirror's effective length.

Referring finally to FIG. 1 in conjunction with FIG. 3, assume a situation in which GTE 10 is designed with a free spectral range (that is, a resonance interval) of 100 GHz in air for light at 194 THz. Per equation (1), assuming normally incident light this means that cavity 130 has a physical thickness L of about 1.5 mm. Further assume it is desirable to keep the resonant frequency points of GTE 10 on a regular grid, that is, to achieve a perfectly periodic resonance interval, between 193.5 THz and 194.5 THz. Further assume that it is determined through, for example, reference to a manufacturer's data sheet, independent testing, or a combination thereof, that material dispersion in the medium of cavity 130 causes the product ncos θ to decrease by about 0.1% from 193.5 THz to 194.5 THz, substantially linearly. Further assume that GTE 10 is tuned to resonance at 193.5 THz. Finally, assume that stack 310, which has a nearly constant effective length, is applied as fully reflective mirror 120.

Under these conditions, the material dispersion in the medium of cavity 130 would cause GTE 10 to be about 200 GHz off resonance (a full two modes higher than expected) at 194.5 THz.

Now assume that stack 320, which has a frequency-dependent effective length, is applied as fully reflective mirror 120 instead of stack 310, either through initial selection or substitution. Per FIG. 3, the effective length of stack 320 increases about 1.5 microns from 193.5 THz to 194.5 THz (about 0.1% of cavity length L), substantially linearly. Through this selection/modification and an appropriate reduction in the physical thickness L of cavity 130 to account for the higher baseline effective length of stack 320 relative to stack 310, the product nLcos θ is corrected to a near constant. Through this tuning, non-periodicity induced by material dispersion is thus substantially reversed and GTE 10 approximates the regular grid.

In general, length dispersion may be adjusted by changing the index step of a dielectric stack as well as the number of layers in the dielectric stack. As is known, the Bragg frequency of a dielectric stack, which corresponds to the frequency of maximum reflectivity and minimum effective length, may be shifted by changing the thickness of the layers in the dielectric stack.

It will be appreciated by those of ordinary skill in the art that the invention can be embodied in other specific forms without departing from the spirit or essential character hereof. The present description is therefore considered in all respects to be illustrative and not restrictive. The scope of the invention is indicated by the appended claims, and all changes that come within the meaning and range of equivalents thereof are intended to be embraced therein.

I claim:

1. A method for using a length dispersion of an etalon, comprising:
    defining a plurality of target resonant frequencies; and
    selecting an etalon having a plurality of resonant frequencies which approximate the target resonant frequencies, wherein the selection is made based at least in part in consideration of a length dispersion of the etalon.

2. The method of claim 1, wherein the selection is made based at least in part in consideration of a length dispersion of a dielectric stack of the etalon.

3. The method of claim 1, wherein the selection is made based at least in part in consideration of a length dispersion of a plurality of dielectric stacks of the etalon.

4. The method of claim 1, wherein the target resonant frequencies comprise at least three periodic frequencies.

5. The method of claim 1, wherein the target resonant frequencies comprise at least three quasi-periodic frequencies.

6. A method for using a length dispersion of an etalon, comprising:
    defining a pluralily of target resonant frequencies;
    determining a material dispersion for an etalon; and
    selecting a length dispersion for the etalon suitable to cooperate with the material dispersion to produce a plurality of resonant frequencies which approximate the target resonant frequencies.

7. The method of claim 6, wherein the selecting step comprises selecting a dielectric stack of the etalon.

8. The method of claim 6, wherein the selecting step comprises selecting a refractive index step of a dielectric stack of the etalon.

9. The method of claim 6, wherein the selecting step comprises selecting a number of layers of a dielectric stock of the etalon.

10. The method of claim 6, wherein the selecting step comprises selecting a layer thickness of a dielectric stack of the etalon.

11. The method of claim 6, wherein the selecting step comprises selecting a plurality of dielectric stacks of the etalon.

12. The method of claim 6, wherein the target resonant frequencies comprise at least three periodic frequencies.

13. The method of claim 6, wherein the target resonant frequencies comprise at least three quasi-periodic frequencies.

14. A method for using a length dispersion of an etalon, comprising:
    determining a length dispersion of an etalon;
    determining an impact of the length dispersion of the etalon on a plurality of resonant frequencies of the etalon; and
    selecting the etalon for application in an optical system based at least in part on the length dispersion of the etalon.

15. The method of claim 14, further comprising comparing the plurality of resonant frequencies of the etalon with a plurality of target resonant frequencies.

16. The method of claim 14, wherein the length dispersion determination is based at least in part on a refractive index step of a dielectric stack of the etalon.

17. The method of claim 14, wherein the length dispersion determination is based at least in part on a number of layers of a dielectric stack of the etalon.

18. The method of claim 14, wherein the length dispersion determination is based at least in part on a thickness of layers of a dielectric stack of the etalon.

19. A method for using a length dispersion of an etalon, comprising:
    determining a length dispersion of an etalon;
    determining an impact of the length dispersion of the etalon a plurality of resonant frequencies of the etalon;
    comparing the plurality of resonant frequencies of the etalon with a plurality of target resonant frequencies; and
    selecting the etalon for application in an optical system based at least in part on a result of the comparison.

20. The method of claim 19, wherein the target resonant frequencies comprise at least three periodic frequencies.

21. The method of claim 19, wherein the target resonant frequencies comprise at least three quasi-periodic frequencies.

22. The method of claim 19, wherein the length dispersion determination is based at least in part on a refractive index step of a dielectric stack of the etalon.

23. The method of claim 19, wherein the length dispersion determination is based at least in part on a number of layers of a dielectric stack of the etalon.

24. The method of claim 19, wherein the length dispersion determination is based at least in part on a thickness of layers of a dielectric stack of the etalon.

* * * * *